United States Patent
Schrenk

(10) Patent No.: US 10,928,273 B2
(45) Date of Patent: Feb. 23, 2021

(54) METHOD AND APPARATUS FOR DETECTING DISCONTINUITIES IN AN OPTICAL CHANNEL, IN PARTICULAR A FIBER OPTIC LINE

(71) Applicant: AIT AUSTRIAN INSTITUTE OF TECHNOLOGY GMBH, Vienna (AT)

(72) Inventor: Bernhard Schrenk, Ulrichskirchen (DE)

(73) Assignee: AIT Austrian Institute of Technology GmbH, Vienna (AT)

( * ) Notice: Subject to any disclaimer, the term of this patent is extended or adjusted under 35 U.S.C. 154(b) by 0 days.

(21) Appl. No.: 16/592,098

(22) Filed: Oct. 3, 2019

(65) Prior Publication Data

US 2020/0110003 A1   Apr. 9, 2020

(30) Foreign Application Priority Data

Oct. 3, 2018   (AT) .............................. A 50847/2018

(51) Int. Cl.
  *G01M 11/00*   (2006.01)
  *G01M 11/02*   (2006.01)
  (Continued)

(52) U.S. Cl.
  CPC .... *G01M 11/3136* (2013.01); *G01M 11/0207* (2013.01); *G01M 11/3127* (2013.01);
  (Continued)

(58) Field of Classification Search
  CPC ........... G01M 11/0207; G01M 11/088; G01M 11/3109; G01M 11/3127; G01M 11/3136;
  (Continued)

(56) References Cited

U.S. PATENT DOCUMENTS 4,997,277 A * 3/1991 Horiguchi ............ G01M 11/319
                                                  356/73.1
5,394,260 A * 2/1995 Suzuki .................. G02F 1/0121
                                                  372/12
(Continued)

FOREIGN PATENT DOCUMENTS

DE    19641441 A1   4/1998
EP    3312582 A1   4/2018

*Primary Examiner* — Sunghee Y Gray
(74) *Attorney, Agent, or Firm* — Laurence A. Greenberg; Werner H. Stemer; Ralph E. Locher

(57) ABSTRACT

A method detects discontinuities in an optical channel using two laser units that respectively have a laser and an electroabsorption modulator. The reference frequencies of the two lasers have a predetermined reference frequency difference. The optical ports of the electroabsorption modulator are fed to the two inputs of a polarization beam splitter and the output of the polarization beam splitter is connected to the optical channel. A test pulse is applied simultaneously to the two electroabsorption modulators and laser light from the lasers is thus transmitted through the respective electroabsorption modulators during the time of the test pulse. The test pulse is divided into two time periods, and during the first time period the lasers are operated with their respective reference frequency, and during the second time period the emission frequencies of the lasers are detuned with respect to the reference frequencies, by a predetermined detuning frequency difference.

6 Claims, 3 Drawing Sheets

(51) Int. Cl.
    *G02F 1/01*     (2006.01)
    *G02F 1/17*     (2019.01)
(52) U.S. Cl.
    CPC ....... *G01M 11/3145* (2013.01); *G02F 1/0121* (2013.01); *G02F 1/17* (2013.01)
(58) Field of Classification Search
    CPC .......... G01M 11/3145; G01M 11/3181; G02F 1/0121; G02F 1/17; H04B 10/071
    USPC ...................................................... 356/73.1
    See application file for complete search history.

(56) References Cited

U.S. PATENT DOCUMENTS

| | | | |
|---|---|---|---|
| 10,673,528 B1* | 6/2020 | Jiang ................. | H04B 10/0775 |
| 2005/0041984 A1* | 2/2005 | Chandler ............ | H04B 10/505 |
| | | | 398/189 |
| 2010/0232787 A1* | 9/2010 | Otani ...................... | G01J 11/00 |
| | | | 398/25 |
| 2011/0155916 A1* | 6/2011 | Furusawa ........... | H01S 3/06791 |
| | | | 250/363.04 |
| 2011/0228255 A1* | 9/2011 | Li ..................... | G01D 5/35364 |
| | | | 356/33 |
| 2015/0110484 A1* | 4/2015 | Lin ..................... | H04B 10/548 |
| | | | 398/16 |
| 2016/0363614 A1* | 12/2016 | Mochizuki ............ | H04L 7/0334 |
| 2018/0113050 A1 | 4/2018 | Fricke | |

* cited by examiner

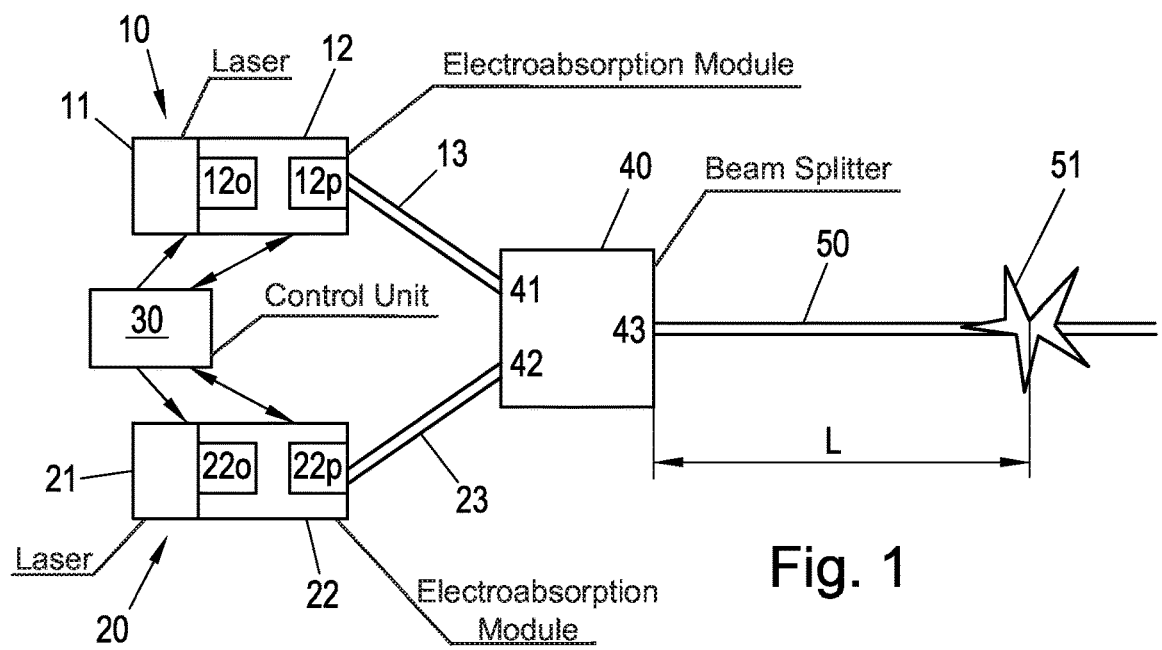
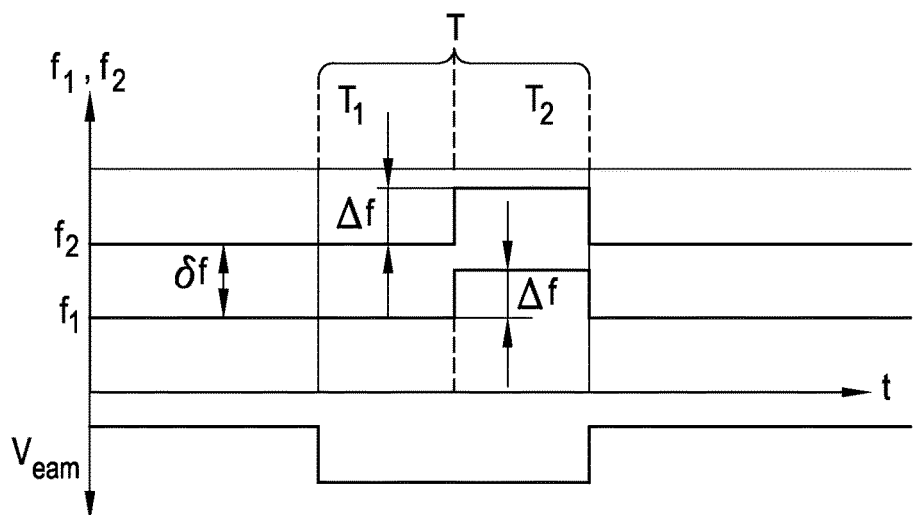
Fig. 2
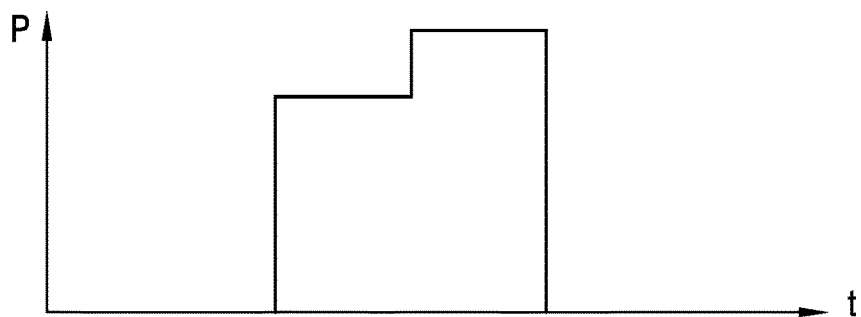
Fig. 3

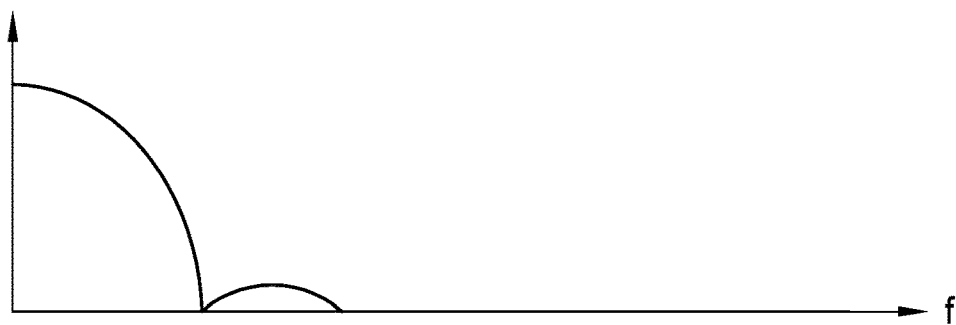
Fig. 4
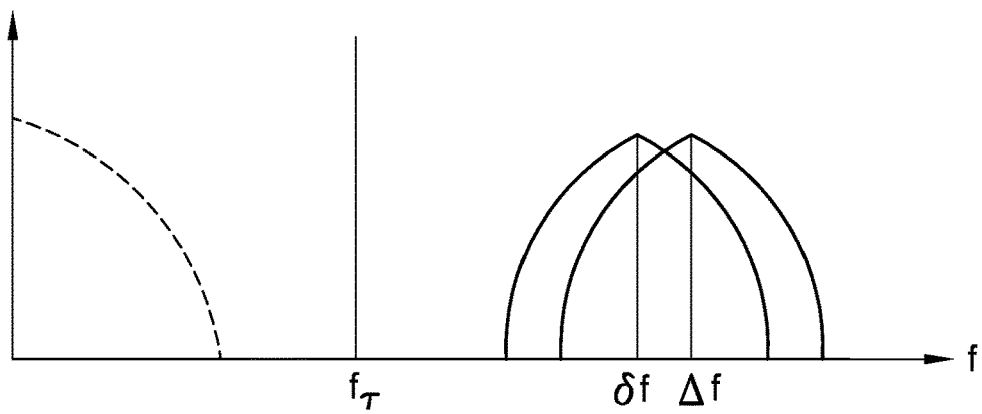
Fig. 5
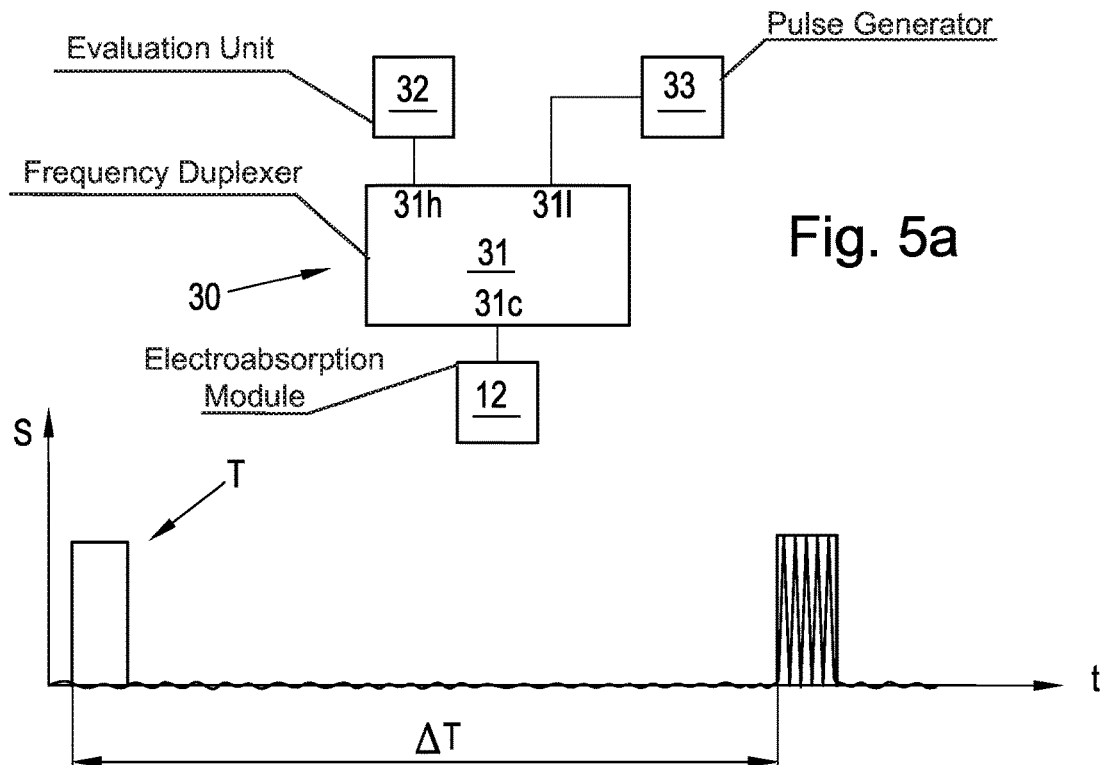
Fig. 5a
Fig. 6

METHOD AND APPARATUS FOR DETECTING DISCONTINUITIES IN AN OPTICAL CHANNEL, IN PARTICULAR A FIBER OPTIC LINE

CROSS-REFERENCE TO RELATED APPLICATION

This application claims the priority, under 35 U.S.C. § 119, of Austrian application AT A50847/2018, filed Oct. 3, 2018; the prior application is herewith incorporated by reference in its entirety.

BACKGROUND OF THE INVENTION

Field of the Invention

The invention relates to a method and an apparatus for detecting discontinuities in an optical channel, in particular a fiber optic line.

A multiplicity of different test methods with which malfunctions in fiber optic networks may be detected in a straightforward manner are known from the prior art. Typically it is envisioned that, in the event of a malfunction, if it is suspected that the fiber optic network has been damaged, a testing device is connected to the fiber optic network in addition to the transmitter located at the end point of the fiber optic line, by which it is possible to test the quality of the optical channel. In particular, such a test known from the prior art may detect discontinuities in the relevant optical channel that are caused, for example, by cable breaks, poor plug connections or similar mechanical impairments of the fiber optic line.

However, especially with widely distributed fiber optic networks, there is the problem that the additional temporary port of a test device to the transmitter used for communication at the end point of the fiber optic network involves a considerable workload.

From the prior art, the use is known of different transmitters to receive and transmit data from a fiber optic network. The invention takes advantage of the circumstance that a multiplicity of transmitters already has externally modulated lasers, which may also be used for testing discontinuities in the optical channel.

SUMMARY OF THE INVENTION

It is accordingly an object of the invention to provide a method and an apparatus for detecting discontinuities in an optical channel, in particular in a fiber optic line that overcome the above-mentioned disadvantages of the prior art devices and methods of this general type.

With the foregoing and other objects in view there is provided, in accordance with the invention, a method in which:
a) two laser units containing two lasers and two electroabsorption modulators are provided and each of the laser units respectively has one of the two lasers and one of the two electroabsorption modulators, the reference frequencies of the two lasers have a predetermined reference frequency difference, in particular in a range from 1 GHz to 10 GHz;
b) the optical ports of the electroabsorption modulator are fed to both inputs of a polarization beam splitter and the output of the polarization beam splitter is connected to the optical channel;
c) a test pulse, in particular having a length of 1 to 10 ns, is applied simultaneously to the two electroabsorption modulators and laser light from the lasers is thus transmitted through the respective electroabsorption modulators during the time of the test pulse;
d) the test pulse is divided into two time periods, in particular time periods of equal length, and during the first time period the lasers are operated with their respective reference frequency, and during the second time period the emission frequencies of the lasers are detuned with respect to the reference frequencies, in particular by modification of the respective laser current, preferably by a frequency of 1 to 10 GHz, by a predetermined detuning frequency difference;
e) the two electroabsorption modulators are put into an opaque state after the end of the test pulse, in which they are illuminated from one side by the lasers at their respective reference frequency and simultaneously absorbing the light of the test pulse reflected via the optical channel at a discontinuity; and
f) the two electroabsorption modulators make available at their optical port a photocurrent that corresponds to the total light incident on them, and the photocurrents thus ascertained, after filtering and/or amplification where appropriate, are considered characteristic of the respective channel.

The invention accomplishes the task by means of an apparatus where:
a) two laser units containing two lasers and two electroabsorption modulators with optical ports and electrical ports are provided. Each of the laser units respectively has one of the two lasers and one of the two electroabsorption modulators, the reference frequencies of the two lasers have a predetermined reference frequency difference, in particular in a range from 1 GHz to 10 GHz;
b) the optical ports of the electroabsorption modulator are fed to the two inputs of a polarization beam splitter and the output of the polarization beam splitter is connected to the optical channel;
c) wherein a control unit is provided that is configured with a pulse generator for generating a test pulse at the electrical ports of the two electroabsorption modulators, for simultaneously applying a test pulse, in particular with a length of 1 to 10 ns. The control unit is formed with a view to controlling the laser current of the two lasers during the emission of the test pulse in such a way, in that, during a first time period, the lasers are operated at their respective reference frequency and, during a second time period, in particular a second time period of equal length and/or following or immediately preceding the first time period, the frequencies of the lasers are detuned with respect to the reference frequencies, by a predetermined detuning frequency difference, preferably by a frequency of 1 to 10 GHz;
d) the control unit is configured so that, after the end of the test pulse, the lasers continue operating at their reference frequencies and the two electroabsorption modulators are put in an absorbing state, in which the electroabsorption modulators absorb both the laser light of the two lasers and any reflected light from the optical channel and make a photocurrent corresponding to the total light incident on them available at the electrical port; and
e) the control unit is configured to monitor the electrical ports of the two electroabsorption modulators after the end of the test pulse.

A particularly simple variant, with which incoming and outgoing signals may be transmitted separately from each other at the modulation port of the electroabsorption modulator, envisions that:

a) the common port of a frequency duplexer is connected to the electrical port of at least one of the electroabsorption modulators;
b) the low-frequency port of the frequency duplexer is connected to a pulse generator that generates the test pulse; and
c) the high-frequency port of the frequency duplexer is connected to an evaluation unit or the characteristic signal is provided at this port.

A particularly advantageous selection of the crossover frequency of the frequency multiplexer, with which an advantageous distinction of the frequency is possible, provides that the crossover frequency of the frequency duplexer is chosen from among the spectral components of the test pulse and the minimum of the reference frequency difference and detuning frequency difference.

In order to be able to use the circuit according to the invention in a simple manner and without additional service effort both for data transmission and for testing the optical transmission channel, it may be provided that a transmission control unit is additionally provided, which is configured to cause the laser units for data transmission and for data reception and the transmission control unit is preferably connected to another network for data transmission, and a switching unit is provided that is configured so as to enable the control unit or the transmission control unit to control the laser units.

Other features which are considered as characteristic for the invention are set forth in the appended claims.

Although the invention is illustrated and described herein as embodied in a method for detecting discontinuities in an optical channel, in particular a fiber optic line it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1 is a block diagram of a transmitter for testing discontinuities in lines;

FIG. 2 is a graph showing the sequence of frequencies used to generate the pulse used to detect discontinuities;

FIG. 3 is a graph showing the temporal progression of the power of a pulse used for detection;

FIGS. 4 and 5 are graphs showing individual frequency components in the emitted and received laser light;

FIG. 5a is a block diagram showing a frequency duplexer and ancillary components;

FIG. 6 is a graph showing schematically the temporal progression of the signal received by an electroabsorption modulator, between the transmission of the pulse and the detection of the pulse's reflection at a discontinuity.

DETAILED DESCRIPTION OF THE INVENTION

Figure 7:
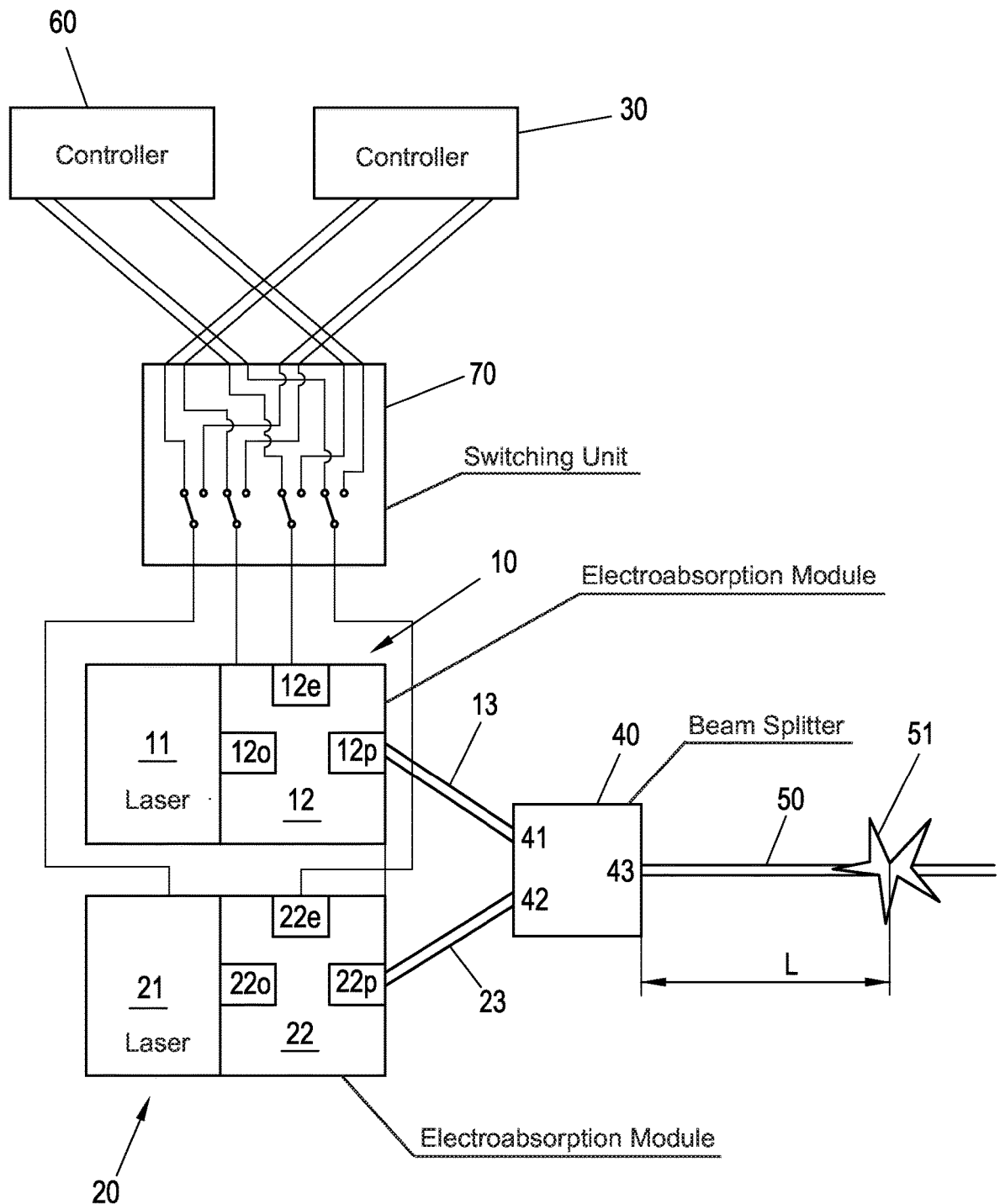
FIG. 7 is a block diagram of an alternative apparatus that makes it possible to switch between a data transmission mode and a discontinuity detection mode.

Referring now to the figures of the drawings in detail and first, particularly to FIG. 1 thereof, there is shown a method for determining optical discontinuities 51 in an optical channel 50, typically a time-of-flight measurement is used, which is based on the circumstance that in the region of optical discontinuities 51, the light that the lasers transmit is at least partially reflected thereonto.

In order to exclude the effects of polarization rotations on the measurement to the greatest possible extent, two laser units 10, 20 are used, which are interconnected by a polarization beam splitter 40 and beam laser light with two different polarization directions into the optical channel being inspected. FIG. 1 shows the two laser units 10, 20, each of which respectively has a laser 11, 21 and an electroabsorption modulator 12, 22 located in the beam path of the laser 11, 21.

Optical ports 120, 12$p$, 220, 22$p$ of the two electroabsorption modulators 12, 22 are connected via optical connecting lines 13, 23 to the two inputs 41, 42 of the polarization beam splitter 40. The output 43 of the polarization beam splitter 40 is connected to the optical channel 50.

To detect discontinuities 51 in the optical channel 50, a test pulse is subsequently generated using the two laser units 10, 20. Typically, the two laser units 10, 20 are controlled by a control unit 30, and the control unit 30 specifies a respective laser current for each of the two lasers 11, 21, and the respective laser frequencies $f_1$, $f_2$ may be set via the same. Additionally or alternatively, the laser frequencies $f_1$, $f_2$ may also be set and stabilized by a temperature controller, which makes it possible to set the frequencies in a wider range. A temperature control of this kind may also be used to eliminate environmental influences, for example room temperature drift.

The light of the lasers 11, 21 is then at least partially reflected at the discontinuities 51. This phenomenon may be identified by the electroabsorption modulators 12, 22, which have the advantageous property that they not only allow the regulation of their transparency by superposing a signal at their electrical port, but also provide a voltage at their electrical port when light from the exterior strikes the electroabsorption modulator.

It is particularly advantageous if the light reflected at discontinuity 51 and the laser light do not have exactly the same frequency, but differ from each other by a predetermined frequency value between 1 and 10 GHz. In this case, an electrical signal is generated on the basis of a quadratic detection characteristic curve of the electroabsorption modulator 12, 22 the frequency of which corresponds to the frequency difference of the two lasers 11, 21. If the same optical frequency were used for transmitting and receiving, the superposition signal produced by the electroabsorption modulator 12, 22 would have a very low frequency, in particular a zero frequency, which would result in very high electrical noise overall. If, in contrast, optical signals are used for detection that differ from each other by certain frequencies, for example in the range of 1 GHz, a modulation signal in the range of this difference frequency—also known as an intermediate frequency—is generated at the electrical port of the electroabsorption modulator 12, 22; this modulation signal is not subject to the above-described noise interference and may also be straightforwardly conditioned in the electronic region.

The specific preparation of a test pulse T is shown in greater detail in FIG. 2. The two lasers 11, 21 emit light with one reference frequency $f_1$, $f_2$ respectively, and the two reference frequencies $f_1$, $f_2$ have a predetermined reference frequency difference δf relative to each other. The reference frequency difference δf may typically be set electrically, for example via a central control unit 30, and is in the range between 1 GHz and 10 GHz. FIG. 2 shows the negative voltage $V_{eam}$ at the electrical port of the two electroabsorption modulators 12, 22 predetermined by the control unit 30, as well as that predetermined by the respective laser current of the laser 11, 21. The test pulse T is divided into two equal time periods $T_1$, $T_2$ as shown in FIG. 2. The duration of a test pulse is typically 1 to 10 ns. A pulse length allows a spatial resolution of the reflected signals of about 20 cm to 2 m for a speed of light of about $2 \times 10^8$ m/s in the optical channel.

After emitting the test pulse, the frequencies of the lasers 11, 21 are reset to the reference frequencies $f_1$, $f_2$. The voltage at the electrical port of the two electroabsorption modulators 12, 22 is reset to a value at which the two electroabsorption modulators 12, 22 are no longer transparent for the laser light.

During the first time period T1, the two lasers 11, 21 are operated with their respective reference frequencies $f_1$, $f_2$. During the second time period $T_2$, the control unit 30 modifies, and in the present case increases, the laser current of the respective lasers 11, 21 by a predetermined detuning frequency difference Δf. The temporal arrangement of the two time periods may also be reversed; in other words, it is also possible that the second time period $T_2$, in which the laser frequencies are detuned or modified, precedes the first time period $T_1$.

As will be apparent from FIG. 3, the luminous power at the output of the two laser units 10, 20 corresponds approximately to the temporal progression shown in FIG. 3. Based on the light's propagation time behavior, the point in the optical channel 50 where optical discontinuities 51 may be present may be ascertained by measuring the reflected light in the region of the laser units 10, 20.

A fundamental problem for this measurement is that due to the unpredictable polarization rotation in the optical channels 50, as occurs in particular in fiber optic lines, optical pulses that the laser 11, 21 generates at a predetermined reference frequency, which are guided into an optical channel 50 with a first polarization, undergo an unpredictable polarization rotation in the optical channel 50, and in the worst case, are subsequently transmitted to the respective other laser unit 10, 20 as a result of the polarization beam splitter 40. However, because in this case the two lasers 11, 21 each have respectively different optical reference frequencies $f_1$, $f_2$, that differ from each other by between 1 and 10 GHz, the reflected signal cannot be received by the electroabsorption modulator 12, 22 or not in the correct frequency range. This is because the electroabsorption modulator 12, 22 is excited by the respective laser 11, 21 and also by the reflected pulse due to the structure shown in FIG. 1. Thus, varying the polarization of the reflected pulse compared to the emitted pulse leads to a shift in the reception frequency.

If, for example, the first laser 11 emits light, this occurs during the first time period $T_1$ of pulse T with a frequency $f_1$, and during the second time period $T_2$ of pulse T with a frequency $f_1+\Delta f$. Likewise, during the first time period $t_1$, the second laser 21 sends a signal with the second reference frequency $f_2$, and during the second time period $T_2$, this frequency is increased to $f_2+\Delta f$. Due to the possible polarization rotation of these signals in the optical channel 50, it cannot be predicted at which of the laser units 10, 20 the thus-generated pulse is received back after being reflected at a discontinuity 51.

Assuming that the total polarization rotation caused by the channel 50 and the optical discontinuity 51 is zero, the portion of the pulse T originating from the first laser 11 is transmitted back to the first modulated laser 10, and the portion of the pulse originating from the second modulated laser 20 is transmitted back to the second modulated laser 20 and superposed with the laser light of the respective laser 11, 12 in the relevant electroabsorption modulator 12, 22, the frequency of that laser having been reset to the reference frequency $f_1$, $f_2$ after the emission of the pulse.

The part of the pulse T that is first in time, which was generated during the time period $T_1$, corresponds in frequency to the reference frequency $f_1$, $f_2$ of the respective laser, so that at the output of the electroabsorption modulator 12, 22, a superposition signal in the low-frequency range is obtained that is subject to a high level of noise-induced interference and cannot be further evaluated. The light produced during the second time period T2 of the pulse T is shifted by the detuning frequency difference Δf with respect to the light of the respective laser 11, 21, which has been reset to the reference frequency $f_1$, $f_2$ after the generation of the pulse T, which results in a voltage signal at the electrical port of the electroabsorption modulator 12, 22, in the range of the frequency Δf predetermined by the detuning frequency difference. This signal is not subject to low-frequency-induced interference and may be straightforwardly processed electrically.

In the event that the polarization of the optical signal is changed—and in the worst case, is orthogonal, while passing through the optical channel 50 to the discontinuity 51 and back to the laser due to reflection, the light that the first laser unit 10 produces arrives at the second laser unit 20 and the light that the second laser unit 20 produces arrives at the first laser unit 10, respectively. In this case, the signals generated during the first time period with the reference frequency $f_1$, $f_2$ are superposed with the reference frequency $f_1$, $f_2$ of the laser of the respective other modulated laser 11, 21, so that there is a frequency difference in the range of the reference frequency difference δf between the respective laser frequency $f_1$, $f_2$ and the frequency of the reflected light. Because this reference frequency difference δf is in the range from 1 GHz to 10 GHz, it may advantageously be tapped at the electrical port of the electroabsorption modulator 12, 22 of the respective laser unit 10, 20.

In particular cases, the light of the pulse T generated during the second time period $T_2$ may additionally be detected. In the present case, the signal emitted by the first laser with a frequency $f_1+\Delta f$ during the second time period $T_2$ is superposed with the laser signal of the second laser 21 with reference frequency $f_2=f_1+\delta f$, so that there is an electrical output signal at the output of the electroabsorption modulator 22 that has a frequency δf−Δf. However, depending on how the frequencies are preset, the frequency of this signal may potentially be too small to be detected without noise. Overall, these signal components may be ignored. The signal emitted by the second laser $f_2$ with a frequency $f_2+\Delta f$, at the first electroabsorption modulator 12, is superposed with the light produced by the first laser 11 with a frequency $f_1$. A signal in the range of an intermediate frequency of Δf−/+δf may be detected at the electroabsorption modulator.

The signal applied to the electrical port of the electroabsorption modulator 12, 22 at different times is shown in FIGS. 4 and 5 with regard to its frequency curve.

FIG. 4 shows the frequency curve of the electrical signal at the input of the electroabsorption modulator 12, 22 at the time the pulse is generated. It will be apparent that for the generation of the pulse T, the electroabsorption modulator 12, 22 is switched to transparent due to an external excitation, so that the pulse T may be emitted via the optical channel 50.

FIG. 5 shows the signal spectrum received, due to the received reflected pulse, at the electrical port of the electroabsorption modulator 12, 22 or a plurality of possible signal spectra related thereto. In addition, to illustrate the frequency difference relative to the transmission signal, the transmission signal is shown as a dashed line. It will be apparent that due to the superposition of the reflected part of the pulse on the respective light of the laser 11, 21, signals are received in the intermediate frequency range that are either in the range of the reference frequency difference δf or the range of the detuning frequency difference Δf.

To straightforwardly separate the incoming signal and the outgoing signal and create a separate input and output at the electroabsorption modulator 12, 22, a common port 31c, i.e. shared frequency port, of a frequency duplexer 31 may be connected to the electrical port of the electroabsorption modulators 12, 22, see FIG. 5a. A low-frequency port 31l of the frequency duplexer 31 is connected to a pulse generator 33 that generates the pulse T, which is associated with and controlled by the control unit. A high-frequency port 31h of the frequency duplexer 31 is connected to an evaluation unit 32 that is associated with the control unit 30. Alternatively, the high-frequency port 31h may be used directly for further processing of the reflected signal. The crossover frequency $f_T$ of the frequency duplexer 31 may advantageously be selected in the intermediate range between the spectral components of the test pulse and the minimum of the reference frequency difference δf and the detuning frequency difference Δf.

In the present case, a test pulse duration of 10 ns was selected, and thus the frequency components emanating from the test pulse are below a frequency of 0.2 GHz. Because both the reference frequency difference δf and the detuning frequency difference Δf are in the 10 GHz range, a crossover frequency of the frequency multiplexer may be defined at about 0.5 GHz.

FIG. 6 schematically depicts the temporal progression of the predominating light in the electroabsorption modulator 12, 22. The time after the emission of the pulse T at which the light is received will differ depending on the position of the discontinuity. Because the sensitivity of the pulse T at different times is relevant depending on the polarization rotation, the accuracy of the measurement is limited by the duration of the pulse T. If the speed of light in the optical channel 50 is ≈ 2×10⁸ m/s and the pulse length is 10 ns, a resolution accuracy of ≈ 200 cm results. Based on the ascertained time at which the reflection was ascertained, taking into account the resolution accuracy, the distance from the laser units 10, 20 to the discontinuity 51 may be inferred.

A particularly preferred embodiment of the invention is shown in greater detail in FIG. 7. There, two different control units 30, 60 are provided, and the control unit 30 corresponding to the control unit 30 described in connection with the preceding exemplary embodiment, and one of the other control units, function as a transmission control unit 60 adapted to cause the electroabsorption modulators 12, 22 to emit data transmission signals and to detect received signals at the electrical port of the electroabsorption modulator 12, 22. In principle, if necessary for data transmission, the transmission control unit 60 is also configured to modify the laser current of the two lasers 11 and 21.

Both the control unit 30 and the transmission control unit 60 thus have a control port for controlling the laser current and an output for connecting to the electrical port 12e, 22e of the electroabsorption modulator 12, 22. The respective ports of the control unit 30 or the transmission control unit 60 are forwarded to a switching unit 70 that makes it possible to connect either the control unit 30 or the transmission control unit 60 to the two laser units 10, 20 in order to be able to carry out both functions alternately in any clock ratio without changing the opto-electronic hardware. The transmission control unit 60 may typically be connected to a digital computer, telephone, antenna or similar device.

The invention claimed is:

1. An apparatus for detecting discontinuities in an optical channel, the apparatus comprising:
    two laser units containing two lasers and two electroabsorption modulators with optical ports and electrical ports, each of said laser units respectively having one of said two lasers and one of said two electroabsorption modulators, wherein reference frequencies of said two lasers having a predetermined reference frequency difference;
    a polarization beam splitter having two inputs and an output, said optical ports of said electroabsorption modulators being fed to said two inputs of said polarization beam splitter and said output of said polarization beam splitter being connected to the optical channel;
    a control unit having a pulse generator for generating a test pulse at said electrical ports of said two electroabsorption modulators, for simultaneously applying the test pulse, wherein said control unit is formed with a view to controlling a laser current of said two lasers during an emission of the test pulse in such a way, in that, during a first time period, said lasers are operated at a respective reference frequency of the reference frequencies and, during a second time period frequencies of said lasers are detuned with respect to the reference frequencies, by a predetermined detuning frequency difference;
    said control unit is configured, so that, after an end of the test pulse, said lasers continue operating at the reference frequencies and said two electroabsorption modulators are put in an absorbing state, in which said electroabsorption modulators absorb both laser light of said two lasers and any reflected light from the optical channel and make a photocurrent corresponding to a total light incident on them available at at least one of said electrical ports; and
    said control unit is configured to monitor said electrical ports of said two electroabsorption modulators after the end of the test pulse.

2. The apparatus according to claim 1,
    further comprising a frequency duplexer having a common port connected to said electrical port of at least one of said electroabsorption modulators;
    wherein said frequency duplexer has a low-frequency port connected to said pulse generator generating the test pulse;
    further comprising an evaluation unit; and
    wherein said frequency duplexer has a high-frequency port connected to said evaluation unit or a characteristic signal is provided at said high-frequency port.

3. The apparatus according to claim 2, wherein a crossover frequency of said frequency duplexer is chosen from among spectral components of the test pulse and a minimum of the reference frequency difference and the predetermined detuning frequency difference.

4. The apparatus according to claim 1, further comprising:
    a transmission control unit being configured to configure said laser units for data transmission and for data reception; and a switching unit configured so as to enable said control unit or said transmission control unit to control said laser units.

5. The apparatus according to claim 1, wherein:
the optical channel is a fiber optic line;
the predetermined reference frequency difference is in a range from 1 GHz to 10 GHz;
the test pulse has a length of 1 to 10 ns;
the second time period is of equal length as the first time period and/or following or immediately preceding the first time period; and
the frequencies of said lasers are detuned with respect to the reference frequencies by a frequency of 1 to 10 GHz.

6. The apparatus according to claim 1, wherein said transmission control unit is connectable to another network for data transmission.

* * * * *